(12) United States Patent
Gildfind et al.

(10) Patent No.: US 9,047,315 B1
(45) Date of Patent: Jun. 2, 2015

(54) GEOTAGGED HASHTAGS

(71) Applicant: Google Inc., Mountain View, CA (US)

(72) Inventors: Andrew Joseph Alexander Gildfind, London (GB); John Alastair Hawkins, London (GB)

(73) Assignee: Google Inc., Mountain View, CA (US)

( * ) Notice: Subject to any disclaimer, the term of this patent is extended or adjusted under 35 U.S.C. 154(b) by 237 days.

(21) Appl. No.: 13/706,199

(22) Filed: Dec. 5, 2012

(51) Int. Cl.
*G06F 17/30* (2006.01)

(52) U.S. Cl.
CPC ................. *G06F 17/30241* (2013.01)

(58) Field of Classification Search
USPC ......................................... 707/747
See application file for complete search history.

(56) References Cited

U.S. PATENT DOCUMENTS

| | | | |
|---|---|---|---|
| 7,085,818 B2 | 8/2006 | Brown et al. | |
| 8,566,309 B2 * | 10/2013 | Jennings | 707/723 |
| 8,595,317 B1 * | 11/2013 | Harris et al. | 709/213 |
| 2009/0019120 A1 | 1/2009 | Muguda | |
| 2011/0119133 A1 * | 5/2011 | Igelman et al. | 705/14.58 |
| 2011/0196935 A1 | 8/2011 | Rideout et al. | |
| 2012/0066212 A1 * | 3/2012 | Jennings | 707/723 |
| 2013/0275880 A1 * | 10/2013 | Bachman et al. | 715/751 |
| 2014/0031068 A1 * | 1/2014 | Yamada et al. | 455/456.3 |

OTHER PUBLICATIONS

Beaumont, Claudine, "Google Maps and Twitter mashup show UK snowfall", The Telegraph, Feb. 2, 2009, retrieved from <http://www.telegraph.co.uk/technology/4433778/Google-Maps-and-Twitter-mashup-shows-UK-snowfall.html>.

Siegler, M. G., "See Geolocated Tweets on Google Maps and the iPhone Too", TechCrunch, Dec. 4, 2009, retrieved from <http://techcrunch.com/2009/12/04/geolocation-tweets-google-maps/>.

"Tweetmapper", Programmable Web, Feb. 19, 2009, retrieved from <http://www.programmableweb.com/mashup/tweetmapper>.

* cited by examiner

*Primary Examiner* — Joshua Bullock

(74) *Attorney, Agent, or Firm* — Dority & Manning, P.A.

(57) ABSTRACT

A system and method for geotagging hashtags. Geographic location information related to a hashtag is determined, and a geolocation is assigned to the hashtag based on the determined geographic location information. The assigned geolocation is stored in association with the hashtag in a data store. The hashtag may be provided for display on a map based on the assigned geolocation stored in the data store.

19 Claims, 6 Drawing Sheets

GEOTAGGED HASHTAGS

BACKGROUND

The present disclosure generally relates to hashtags in electronic messages, and more particularly, to associating hashtags with geographic locations. Hashtags are used in conjunction with a variety of electronic messages to allow searches for messages that are drawn to related subjects. Some hashtags may pertain to subjects that are associated with a geographic location.

SUMMARY

The disclosed subject matter relates to a method for geotagging hashtags. The method includes determining geographic location information related to a hashtag and assigning a geolocation to the hashtag based on the determined geographic location information. The method further includes storing the assigned geolocation in association with the hashtag in a data store and providing the hashtag for display in response to a geographic user query based on the assigned geolocation stored in the data store.

The disclosed subject matter further relates to a system for geotagging hashtags. The system includes one or more processors and a memory containing processor-executable instructions. When executed by the processors, the system determines geographic location information for a hashtag from electronic messages containing the hashtag and assigns a plurality of geolocations to the hashtag based on the determined geographic location information. The system also stores the assigned geolocations as a vector in association with the hashtag in a data store and provides the hashtag for display on a map in response to a user query based on the vector of assigned geolocations stored in the data store.

The disclosed subject matter also relates to a machine-readable storage medium storing machine-executable instructions to perform a method for geotagging hashtags. The method includes determining geographic location information related to multiple hashtags from multiple electronic messages containing the hashtags. The method further includes assigning one or more geolocations to each of the hashtags based on the determined geographic location information. The method further includes storing the one or more assigned geolocations as respective vectors in association with the hashtags, respectively, in a data store, where the hashtags are searchable in the data store based on geolocation.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for the purpose of explanation, several aspects of the subject technology are set forth in the following figures.

DETAILED DESCRIPTION

Figure 1:
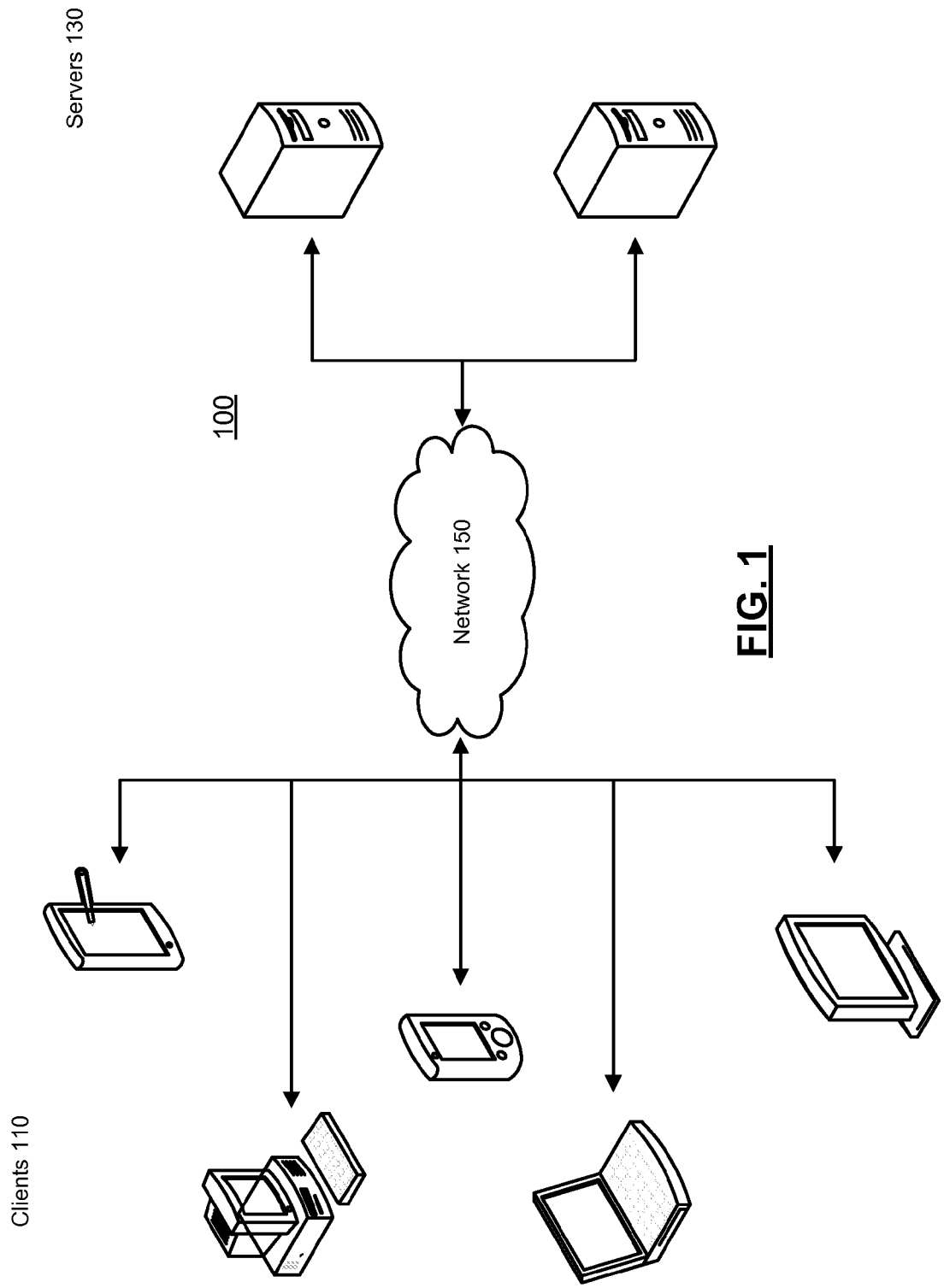
FIG. 1 illustrates an example system for geolocating hashtags.

In the following detailed description, numerous specific details are set forth to provide a full understanding of the subject technology. It will be apparent, however, that different aspects of the subject technology may be practiced without some of these specific details. In other instances, well-known structures and techniques have not been shown in detail so as not to obscure the disclosure.

Hashtags are used in electronic messaging to categorize the content or subject of an electronic message and to facilitate searching for electronic messages related to the content or subject. Hashtags may refer to subjects that are associated with geographic locations. The subject technology provides a system in which hashtags are geolocated and associated with the geographic locations that correspond to the subjects of the hashtag. Hashtags may then be searchable based on geolocation and displayed on a map at the associated geolocations.

The subject technology concerns the creation and maintenance of a data store containing hashtags and associated geolocations. Each hashtag in the data store is associated with a geolocation or a vector of geolocations. The data store is searchable based on geolocation or hashtag for responding to user queries and to populate maps with hashtag labels at locations corresponding to the geolocations associated with the hashtags. The system may be seeded initially with hashtags that correspond directly to geolocations. For example, hashtags that include the name of a city, state, county, etc. may be stored in the data store in association with a vector of geolocations that define the boundary of the city, state, county, etc. As another example, hashtags that include postal codes or telephone area codes may be stored in the data store in the data store in association with a vector of geolocations that define the boundary of the postal code area or the geographical area covered by the telephone area code. As yet another example, hashtags that include the names of popular places, such as landmarks, buildings, parks, etc., that are already geotagged in other data stores may be stored in the data store in association with the known geolocation or vector of geolocations associated with the popular place.

The subject technology enhances and improves the listing of hashtags and associated geolocations by determining geographic location information related to hashtags that do not have a known association with a geolocation and assigning geolocations to those hashtags based on the determined geographic information. The subject technology may analyze electronic messages that contain hashtags and determine geographic information from the text of the electronic messages besides the hashtags themselves or metadata associated with the electronic messages. For example, an electronic message containing a hashtag may reference a geotagged subject or the electronic message itself may be geotagged.

Multiple electronic messages containing geographic location information and the same hashtag may be used to geotag the hashtag to increase the accuracy and precision of the assigned geolocation. For example, multiple geolocations may be stored in a vector of geolocations associated with a hashtag. As new geographic location information is determined from electronic messages containing the hashtag, additional geolocations may be added to the vector. A new geolocation may be added to the vector automatically, or may be evaluated in comparison with the existing geolocations already stored in the vector. For example, a centroid of all of the existing geolocations may be calculated and new geolocations may be added to the vector only if the new geolocation is within a predetermined range of the centroid. Alternatively, a bounding polygon may be determined using the existing geolocations and new geolocations may be added to the vector only if the new geolocation is either within the bounding polygon or within a predetermined range of the bounding polygon. This comparison and analysis may be performed in an on-going fashion to continuously refine the geolocation of the hashtag. The subject technology may stop adding to the vector and permanently assign a geolocation or vector of geolocations to a hashtag once a certain number of electronic messages containing the hashtag have been analyzed for geographic location information and/or a variance of the determined geographic location information from a certain number of electronic messages or electronic messages analyzed over a certain period of time falls below a threshold.

The geographic location information determined from the electronic messages may indicate a location is either a single point (e.g., an address of a building) or an area (e.g., a forest). Accordingly, the geolocation of the hashtag may be determined to be a single point, or an enclosed region defined by multiple points. Geographic location information may be ranked based on the source of the message containing the information. The geolocation of the hashtag may be refined by ranking by according more weight to geographic location information from well-established and accurate sources. Geographic location information may be stored in the data base in addition to the geolocation of the hashtag.

A mapping interface may also be provided to allow a user to view hashtags stored in the data store on a map based on the user's geolocation or a geographic user query. The user query may be based on the hashtag itself, or a location on a map. The hashtag may be provided for display on a map at the geolocation associated with the hashtag. The hashtags may be provided to the user based on a search specifying a geographic area or a known location of the user. Geographic location information related to a hashtag may be received via a mapping interface where a user can select a point or region on a displayed map to associate with a selected hashtag. The geolocations of the selected point or region are included in the vector associated with the hashtag in the data store.

Turning to the drawings, FIG. 1 illustrates an example system 100 for geolocating hashtags. The system 100 includes clients 110 and servers 130 connected over a network 150.

The system 100 is comprised of client(s) 110, server(s) 130 and the network 150 in any combination or configuration that allows for geolocating hashtags, including implementations with multiple servers 130. Each of the clients 110 can be, for example, a desktop computer, a laptop computer, a mobile device (e.g., a smartphone, tablet computer, or PDA), a set top boxes (e.g., for a television), a television with one or more processors embedded therein or coupled thereto, a video game console, or any other device having a processor, memory, and communications capabilities. In certain instances, different versions and/or configurations of the system that include subject technology as disclosed herein are available for download from a server 130 and subsequent installation on client 110. The servers 130 can be any device having a processor, memory, and communications capability for hosting the data for installing and hosting the system. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a ring network, a mesh network, a star-bus network, tree or hierarchical network, and the like.

Figure 2:
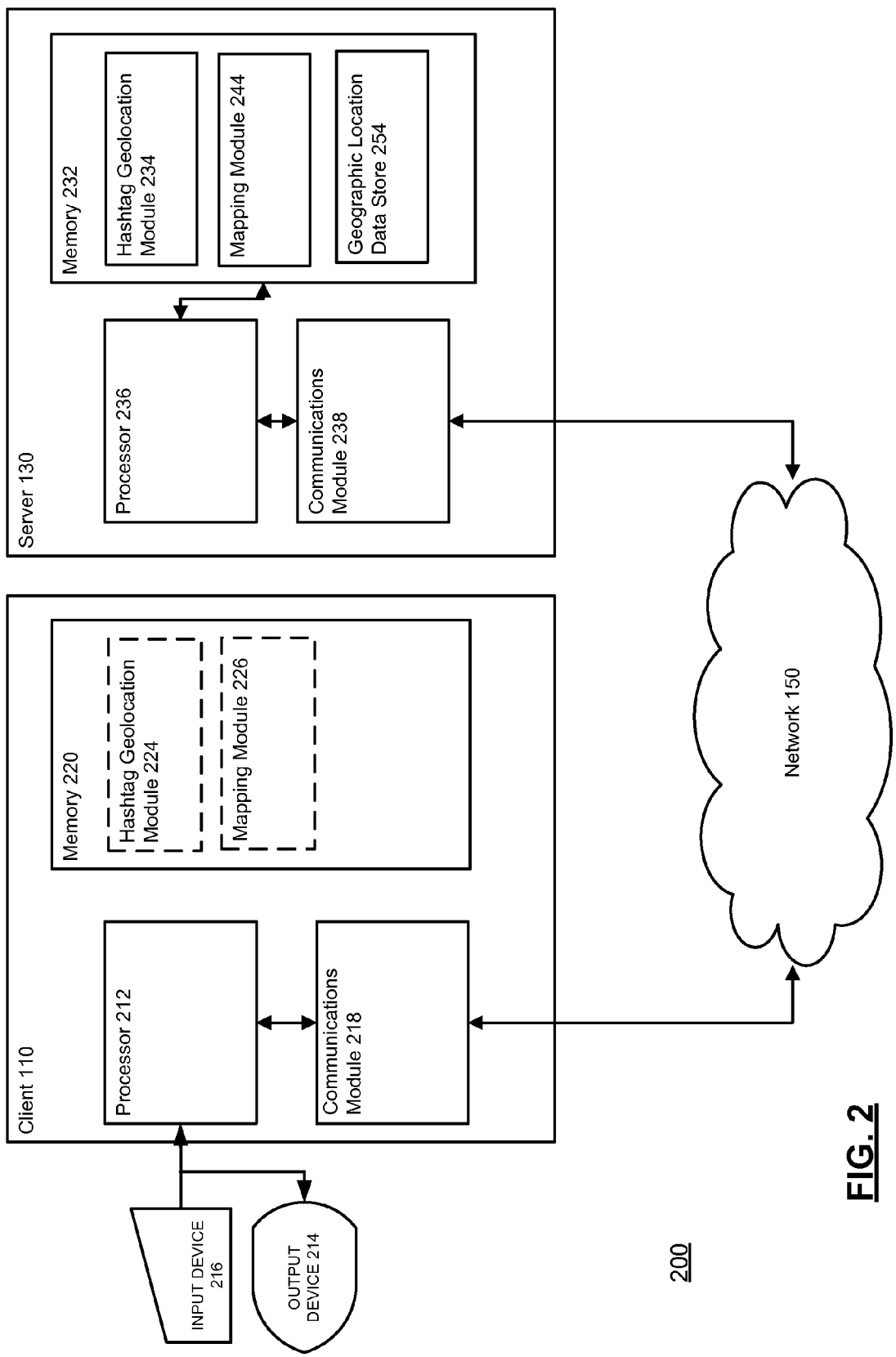
FIG. 2 is a block diagram illustrating an example client and server from the system of FIG. 1.

FIG. 2 is a block diagram illustrating an example client and server from the system 100 of FIG. 1 according to certain aspects of the subject technology. The client 110 and the server 130 are connected over the network 150 via respective communications modules 218 and 238 and are configured to interface with the network 150 to send and receive information, such as data, requests, responses, and commands to other devices on the network. The communications modules 218 and 238 can be, for example, modems or Ethernet cards.

The client 110 includes a processor 212, the communications module 218, and a memory 220 that may include a hashtag geolocation module 224 and a mapping module 226. The processor 212 of the client 110 is configured to execute instructions, such as instructions physically coded into the processor 212, instructions received from software in memory 220, or a combination of both. For example, processor 212 may read instructions from hashtag geolocation module 224 and/or mapping module 226 to send hashtag or geolocation search query information to server 130 or processor 212 may use instructions from geolocation module 224 and/or mapping module 226 to provide a display to the user through output device 214 which includes hashtags displayed at the corresponding geolocations on a map.

Server 130 includes a processor 236, the communications module 238, and a memory 232 that may include a hashtag geolocation module 234, a mapping module 224, and a geographic location data store 254. Processor 236 is configured to execute instructions, such as instructions physically coded into the processor 236, instructions received from software in memory 232, or a combination of both. For example, processor 236 may read instructions from hashtag geolocation module 234 and mapping module 224 so that the server 130 determines geographic location information for a hashtag, assigns a geolocation to the hashtag based on its geographic location information, and stores the assigned geolocation, the hashtag, and the geographic location information in geographic location data store 254. The hashtag geolocation module 234, mapping module 244, and geographic location data store 254 may additionally receive search query related information regarding a hashtag or geographic location so that search results including hashtags and associated geolocation may be provided for display on client 110. Processor 236 processes information from the module 232 and sends information through communications module 238, through network 150, to client 110 to be displayed on output device 214.

A user may enter a search query for a geographic location or a hashtag through a user interface of a mapping application into input device 216. The entered search query may be provided to processor 212 and processed by the hashtag geolocation module 224 and/or mapping module 226 stored in memory 220. The search query may then be sent through network 150 via communications module 218 to server 130, which receives the information through communications module 238. Processor 236, in conjunction with data and instruction stored in hashtag geolocation module 234, mapping module 224, and geographic location data store 254 then provide the results of the search query to client 110 via communications module 238 and network 150 for display on output device 214.

Figure 3:
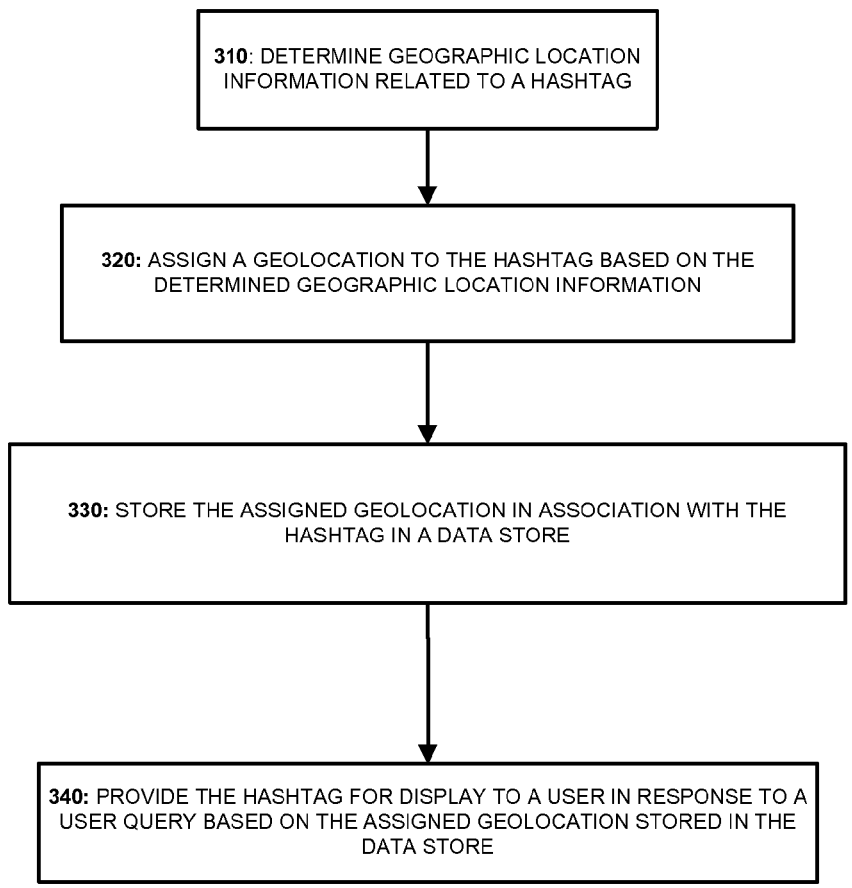
FIG. 3 illustrates an example process for geolocating hashtags.

FIG. 3 illustrates an example process 300 for geotagging hashtags as shown by the example client 110 and server 130 of FIG. 2. Although process 300 of FIG. 3 is described with reference to FIG. 2, the process 300 is not limited to such a configuration and can be applied to other systems and configurations.

The process begins with step 310, in which the server 130 determines geographic location information related to a hashtag. Geographic location information may be obtained from any portion of an electronic message associated with the hashtag (e.g., text or metadata) and may also be obtained from the hashtag's character string. Additional geographic location information may be provided by a user through a map interface. For instance, a user may indicate a hashtag on a map and designate a place that the hashtag refers to on a map displayed to the user. The user may additionally move or change a boundary line for a hashtag that has an preexisting geolocation.

The term "electronic message" as used herein encompasses its plain and ordinary meaning, including, but not limited to any message on an electronic medium in which a hashtag may appear. Micro blogs, comments, and other electronic messages may be associated with a short message service, a website that allows users to contribute comments, a social networking website, or the like.

Geographic location information may be expressed as latitude and longitude coordinates a place name, landmark, post code, zip code, city, state, country, address, intersection, or any other area that has a geographic location. The geographic location information may indicate a point or define a bounded region. Geographic location information may be acquired from several sources of an individual message and may be acquired from a selection of multiple messages that contain the hashtag. The selection of messages may be determined based on a time frame or source of the messages. Information may be collected in an ongoing fashion. A geolocation for the hashtag may become permanent; thus, it may become unnecessary to continue to acquire geographic location information after a geolocation for the hashtag becomes permanent.

A hashtag may become "established" before a hashtag becomes permanent once newly acquired geographic location information ceases to change above a threshold amount of variance. Once a hashtag has become "established" the method may reduce the frequency with which geographic location information is acquired for a hashtag.

For example, a hashtag, #UKFOREST, may appear in a microblog message posted by a user. The user may be microblogging from the user's mobile device (i.e., client 110) and post the message "Never thought I'd get lost somewhere in the #UKFOREST while taking a stroll in Sherwood Forest! HELP!" Geographic location information may be inferred from the place recited in text of the message, "Sherwood Forest." Additional geographic location information such as the latitude and longitude of the user's mobile device may be acquired from metadata in the message. Finally, the hashtag itself may provide geographic location information because the hashtag is a location itself.

In step 320, the server 130 assigns a geolocation to the hashtag based on the acquired geographic location information. The geolocation may be expressed as latitude and longitude coordinates. Geolocation may be assigned as a single point or as an enclosed region defined by a vector of geolocations. The geolocation may be assigned in consideration of multiple pieces of geographic location information from one message, or from multiple messages. Geolocation may established by determining a centroid of the acquired geographic location information and the centroid may be assigned as the geolocation of the hashtag.

The geolocation may additionally be determined by ranking the acquired geographic location information and considering a subset of the information based on rank. Rank may be determined based on one or more of the source of the information, time of acquisition, popularity of the source (e.g., a ranking of the electronic message in the forum in which it is disseminated) or other factors or combinations of factors. Geolocation may be determined by determining a centroid of a subset of geographic location information based on rank.

In step 330, server 130 stores the assigned geolocation in association with the hashtag in the data store. Additional geolocations may be determined for a hashtag and may be compared with the assigned geolocation. The stored geolocation may be changed or refined based on determinations of the geolocation of the hashtag over time. A permanent geolocation may be assigned to the hashtag once a variance amongst the acquired geographic location information from electronic messages falls below a threshold. Once a geolocation has become permanently assigned to the hashtag, the geographic point or enclosed region assigned to the hashtag as its geolocation will not be moved or adjusted. Geographic location information may cease to be acquired when a hashtag's geolocation becomes permanent.

The process ends in step 340 when the server 130 provides client 110 with the hashtag for display in response to a user query, such as a geographic user query in a mapping interface. A user, through client 110, may access a mapping application that allows the user to enter a search query for a particular hashtag or a geographic location. When entering a hashtag as the search query, the mapping application may provide the user with a map indicating the point or boundary associated with the hashtag. When the search query contains a geographic location, a map may be displayed with all hashtags that are within, or near the entered geographic location. The user may additionally enter a search for a map of "hashtags near me," in which the current geolocation of the user becomes the location of the search. The current geolocation of the user may be determined by the user's client 110. A map is then displayed to the user indicating hashtags that are near the user. The user may additionally specify the outer physical distance as a search parameter. For instance, a user may wish to see hashtags that are within ten kilometers of the user's current geolocation. Accordingly, the map will default to a map display that shows hashtags within a ten kilometer radius of the user's current geolocation.

In the #UKFOREST example above, the user who sent the electronic message including the #UKFOREST hashtag could enter the hashtag as the search term or could request "hashtags near me." With the search term #UKFOREST, the user would receive a map of the United Kingdom, indicating the boundaries associated with national forests across the country. If the same user entered "hashtags near me," the user would receive a map indicating the user's current geolocation in Sherwood Forest with an indication that the user location is within the region that is associated with the hashtag #UKFOREST. In this particular case, additional hashtags that have geolocations near the current geolocation of the user would be displayed. For instance, a hashtag #SHERWOOD- FOREST may appear on the map displayed to the user indicating that the user is also currently located within Sherwood Forest.

Figure 4A:
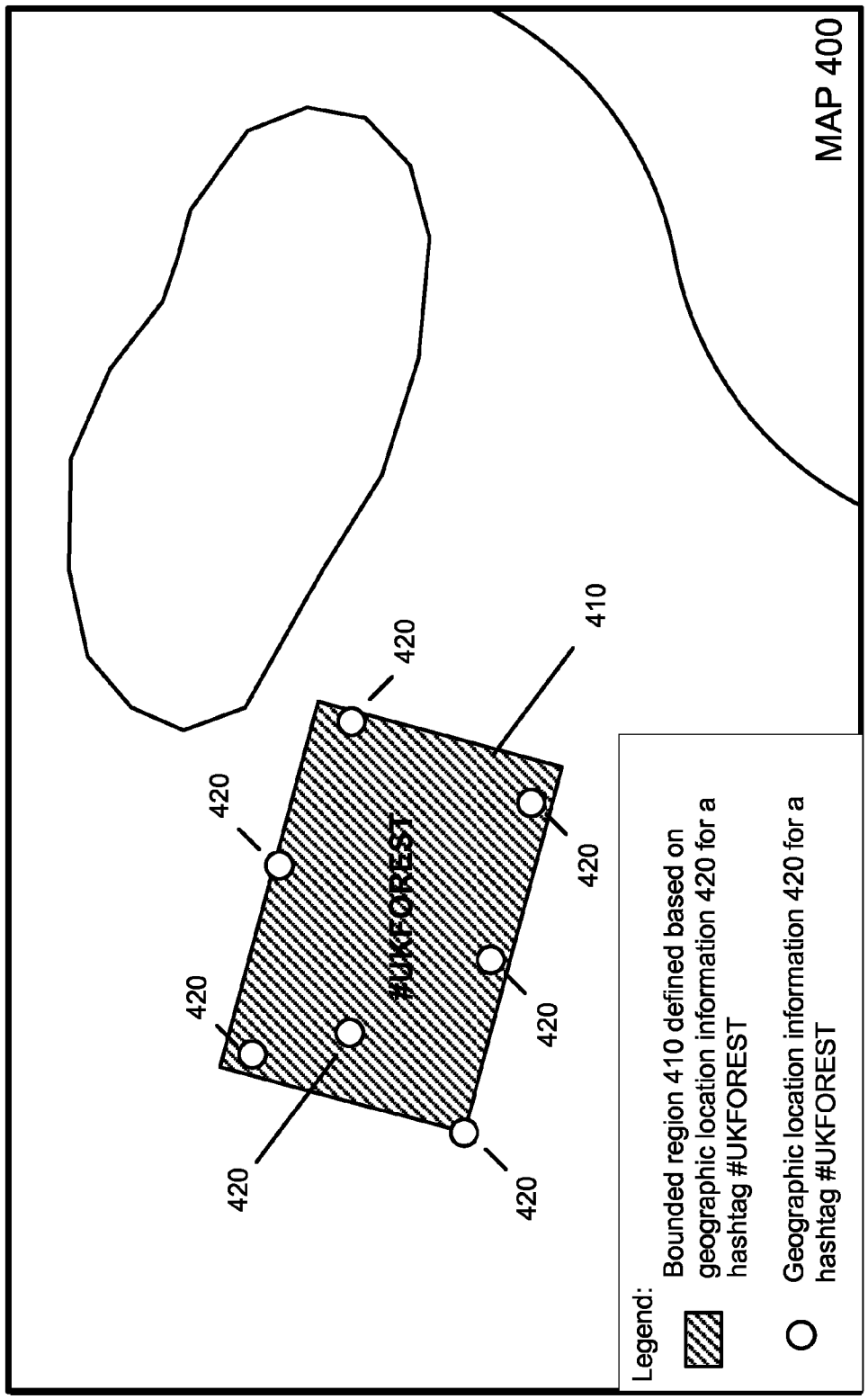
FIG. 4a is an illustration of a map displaying a geolocated hashtag.

FIG. 4a is an illustration of a map 400 displaying a geolocated hashtag. The hashtag #UKFOREST may have geographic location information 420 in a variety of locations on the map 400. The multiple circles indicating geographic location information 420 define a boundary as a group, or each circle may indicate a small region within the boundary of the circle. The geolocation of the hashtag is based on all the geographic location information 420. An enclosed region 410 may then be defined based on the geographic location information 420. The bounded region 410 may then be displayed on a map to a user. Geographic location information 420 may not be shown in the display to the user.

Figure 4B:
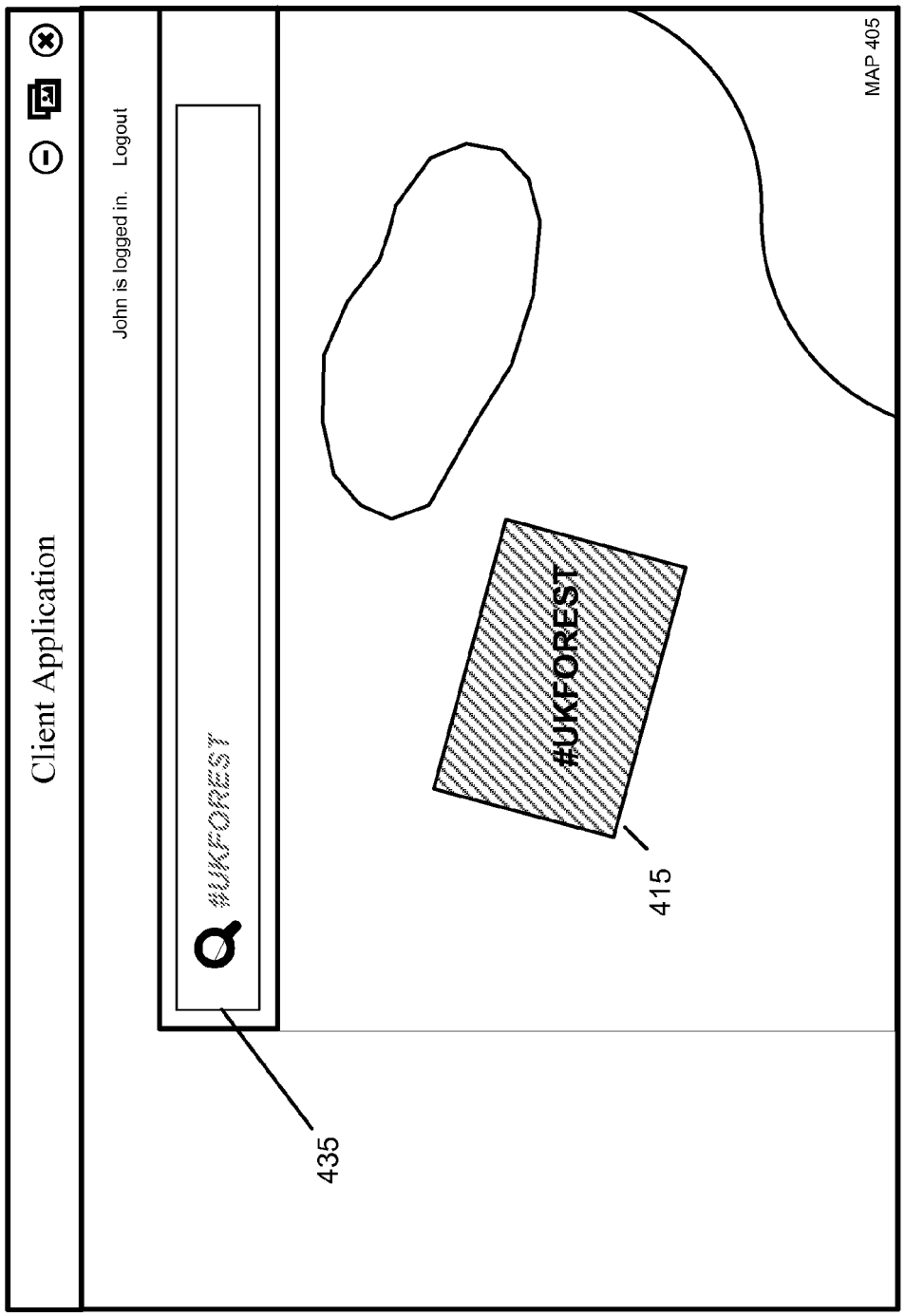
FIG. 4b is an illustration of a graphical user interface 410 of a client application displaying a map 405.

FIG. 4b is an illustration of a graphical user interface 410 of a client application displaying a map 405. A user may search for hashtag #UKFOREST in search box 435. The subject technology then displays enclosed region 425. Map 405 corresponds to map 400 of FIG. 4a. Accordingly, enclosed region 415 of map 405 is displayed to the user but not the underlying geographic location information associated with the hashtag.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject technology can be implemented as sub-parts of a larger program while remaining distinct software aspects of the subject technology. In some implementations, multiple software aspects can also be implemented as separate programs. Finally, any combination of separate programs that together implement a software aspect described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
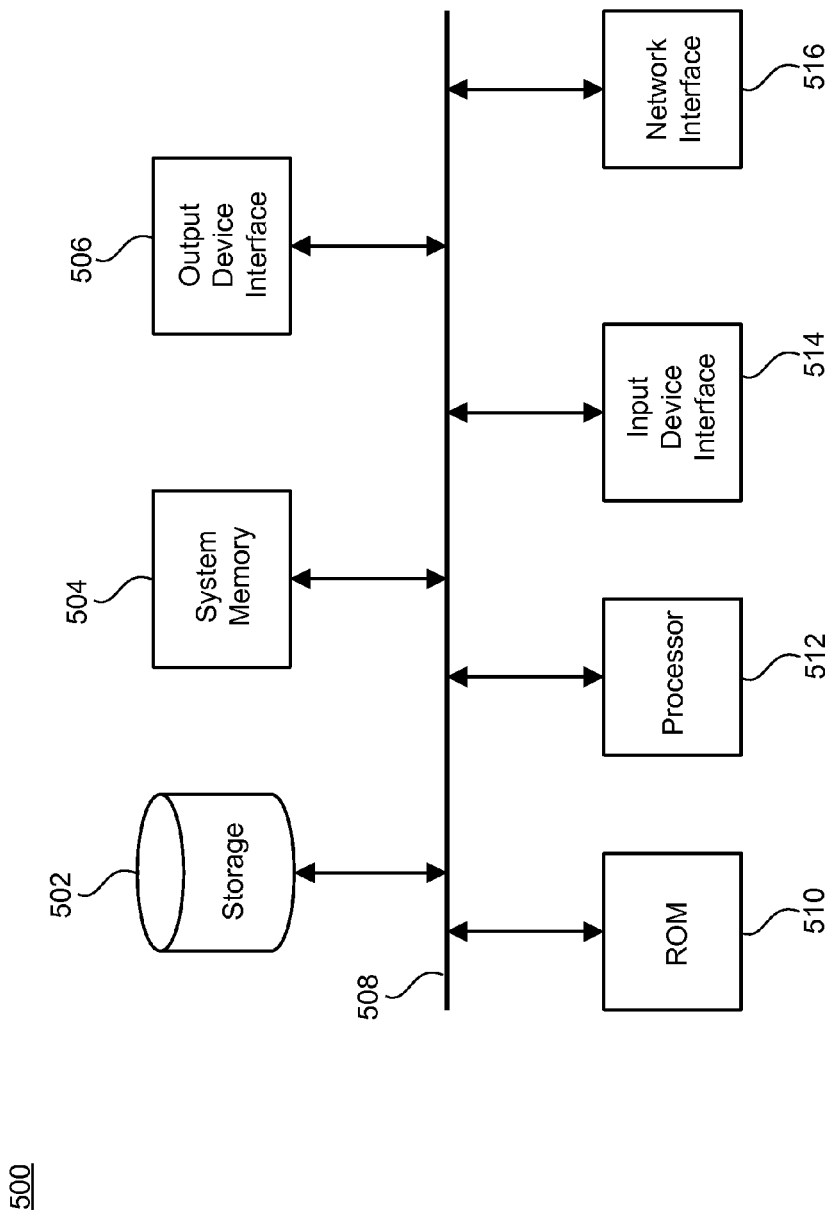
FIG. 5 is a block diagram illustrating an electronic system with which some implementations of the subject technology are implemented.

FIG. 5 conceptually illustrates an electronic system with which some implementations of the subject technology are implemented. Electronic system 500 can be a computer, phone, PDA, or any other sort of electronic device. Such an electronic system includes various types of computer-readable media and interfaces for various other types of computer-readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject technology. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject technology use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as a random access memory. System memory 504 stores some of the instructions and data that the processor needs at runtime. In some implementations, the processes of the subject technology are stored in system memory 504, permanent storage device 502, and/or ROM 510. For example, the various memory units include instructions for providing for geolocating hashtags in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interface 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers such as a local area network ("LAN"), a wide area network ("WAN"), or an Intranet, or a network of networks, such as the Internet. Any or all components of electronic system 500 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Aspects of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology. Features described under one heading or one subheading of the subject disclosure may be combined, in various embodiments, with features described under other headings or subheadings. Further it is not necessarily the case that all features under a single heading or a single subheading are used together in embodiments.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method for geotagging hashtags, the method comprising:
   determining geographic location information related to a hashtag;
   assigning a geolocation to the hashtag based on the determined geographic location information;
   storing the assigned geolocation in association with the hashtag in a data store; and
   providing the hashtag for display to a user in response to a geographic user query based on the assigned geolocation stored in the data store;
   wherein the geographic user query comprises a map request based on a geolocation of a user, and
   wherein the hashtag is included at the assigned geolocation in a map provided for display to the user.

2. The method of claim 1, wherein the geographic location information is determined from metadata associated with an electronic message comprising the hashtag.

3. The method of claim 1, wherein the geographic location information is determined from text of an electronic message containing the hashtag.

4. The method of claim 1, wherein the geographic location information is determined from user input received at a mapping user interface identifying a region on a displayed map.

5. The method of claim 1, further comprising:
   assigning a plurality of geolocations to the hashtag based on the determined geographic location information; and
   storing the plurality of geolocations in a vector associated with the hashtag.

6. The method of claim 5, further comprising:
   determining a centroid of the plurality of geolocations; and
   assigning the determined centroid as the geolocation associated with the hashtag.

7. The method of claim 1, wherein the geographic location information for the hashtag is determined from a plurality of electronic messages containing the hashtag.

8. The method of claim 7, further comprising:
   ranking the geographic location information acquired from each of the plurality of electronic messages; and
   assigning the geolocation to the hashtag based on the ranking of the determined geographic location information.

9. The method of claim 7, further comprising:
   assigning a permanent geolocation to the hashtag once a variance amongst the determined geographic location information from the plurality of electronic messages falls below a threshold.

10. The method of claim 1, wherein the map comprises a plurality of hashtags at respective assigned geolocations on the map.

11. A system for geotagging hashtags, the system comprising:
    one or more processors; and
    a memory containing processor-executable instructions that, when executed by the one or more processors, cause the system to:
       determine geographic location information for a hashtag from a plurality of electronic messages containing the hashtag;
       assign a plurality of geolocations to the hashtag based on the determined geographic location information;
       store the plurality of assigned geolocations as a vector in association with the hashtag in a data store; and
       provide the hashtag for display on a map in response to a user query based on the vector of assigned geolocations stored in the data store.

12. The system of claim 11, wherein the geographic location information is determined from text of the plurality of electronic messages containing the hashtag.

13. The system of claim 11, wherein the geographic location information is determined from metadata associated with the plurality of electronic messages containing the hashtag.

14. The system of claim 11, wherein the system is further caused to:
    determine a centroid of the plurality of assigned geolocations; and
    store the determined centroid in associated with the hashtag in the data store,
    wherein the hashtag is provided for display on the map at the determined centroid.

15. The system of claim 11, wherein the plurality of assigned geolocations are added to an existing vector stored in the data store in association with the hashtag.

16. The system of claim 15, wherein the system is further caused to:
    determine a bounding polygon based on a plurality of existing geolocations in the existing vector stored in the data store; and
    determine if the plurality of assigned geolocations are within a threshold distance of the bounding polygon,
    wherein only assigned geolocations within the threshold distance of the bounding polygon are added to the existing vector stored in the data store in association with the hashtag.

17. The system of claim 11, wherein the user query comprises a map request based on a geolocation of the user; and
    wherein the hashtag is included in a region defined by the vector of assigned geolocations on the map provided for display to the user.

18. A machine-readable storage medium storing machine-executable instructions for causing a processor to perform a method for geotagging hashtags, the method comprising:
    determining geographic location information related to a plurality of hashtags from a plurality of electronic messages containing the plurality of hash tags;
    assigning one or more geolocations to each of the plurality of hashtags based on the determined geographic location information;

storing the one or more assigned geolocations as respective vectors in association with the plurality of hashtags, respectively, in a data store; and providing the plurality of hashtags for display to a user on a map based on the respective vectors of assigned geolocations.

19. The machine-readable storage medium of claim 18, wherein the plurality of hashtags are searchable in the data stored based on geolocation.

* * * * *